United States Patent
Lee et al.

(10) Patent No.: US 10,015,704 B2
(45) Date of Patent: Jul. 3, 2018

(54) METHOD OF CONTROLLING HANDOVER

(71) Applicant: KT CORPORATION, Gyeonggi-do (KR)

(72) Inventors: Hyun-Song Lee, Seoul (KR); Si-Young Heo, Seoul (KR); Kyungjun Lee, Gyeonggi-do (KR); Yongjoo Tcha, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 25 days.

(21) Appl. No.: 14/652,121

(22) PCT Filed: Jul. 26, 2013

(86) PCT No.: PCT/KR2013/006719
§ 371 (c)(1),
(2) Date: Jun. 14, 2015

(87) PCT Pub. No.: WO2014/092280
PCT Pub. Date: Jun. 19, 2014

(65) Prior Publication Data
US 2015/0341834 A1    Nov. 26, 2015

(30) Foreign Application Priority Data

Dec. 14, 2012 (KR) .......................... 10-2012-0146715

(51) Int. Cl.
*H04W 36/08* (2009.01)
*H04W 24/08* (2009.01)
(Continued)

(52) U.S. Cl.
CPC ............ *H04W 36/0083* (2013.01); *H04L 5/14* (2013.01); *H04L 5/1438* (2013.01); *H04W 24/08* (2013.01);
(Continued)

(58) Field of Classification Search
None
See application file for complete search history.

(56) References Cited

U.S. PATENT DOCUMENTS

2002/0165789 A1* 11/2002 Dudek ............... G06Q 30/0601
705/26.1
2002/0197992 A1* 12/2002 Nizri .................... H04W 60/04
455/435.1
(Continued)

FOREIGN PATENT DOCUMENTS

KR    10-2009-0042494 A    4/2009
KR    10-2009-0050357 A    5/2009
(Continued)

*Primary Examiner* — Ayaz Sheikh
*Assistant Examiner* — Tarell Hampton
(74) *Attorney, Agent, or Firm* — IP Legal Services, LLC

(57) ABSTRACT

A first base station may perform a method for controlling handover of a terminal. The method may include setting a handover parameter that is determined based on a handover policy and transmitting a message including the handover parameter to the terminal. The handover parameter includes a service parameter. The service parameter is used when determining a handover condition of the terminal in order to induce handover from the first base station to the second base station according to the handover policy.

13 Claims, 8 Drawing Sheets

(51) Int. Cl.
*H04L 5/14* (2006.01)
*H04W 88/02* (2009.01)
*H04W 88/08* (2009.01)
*H04W 36/00* (2009.01)

(52) U.S. Cl.
CPC ........... *H04L 5/1469* (2013.01); *H04W 88/02* (2013.01); *H04W 88/08* (2013.01)

(56) References Cited

U.S. PATENT DOCUMENTS

| | | | | |
|---|---|---|---|---|
| 2005/0026615 A1* | 2/2005 | Kim | .................. | H04W 36/0072 455/436 |
| 2005/0197124 A1* | 9/2005 | Kang | .................... | H04W 36/30 455/439 |
| 2005/0265312 A1* | 12/2005 | Thermond | ........ | H04L 29/06027 370/352 |
| 2006/0009253 A1* | 1/2006 | Nielsen | .................. | H04W 36/14 455/552.1 |
| 2006/0030323 A1* | 2/2006 | Ode | ...................... | H04W 36/30 455/436 |
| 2006/0148480 A1* | 7/2006 | Thorson | ............ | H04W 36/0055 455/442 |
| 2007/0041347 A1* | 2/2007 | Beale | .................... | H04W 48/10 370/335 |
| 2008/0045262 A1* | 2/2008 | Phan | .................. | H04W 36/0083 455/525 |
| 2008/0102832 A1* | 5/2008 | Sengupta | ................ | H04L 65/80 455/435.2 |
| 2008/0139147 A1* | 6/2008 | Wu | ......................... | H04L 63/08 455/187.1 |
| 2008/0176566 A1* | 7/2008 | Akita | ................... | H04W 36/32 455/436 |
| 2008/0311924 A1* | 12/2008 | Lucidarme | ............ | H04W 48/18 455/452.1 |
| 2009/0104905 A1* | 4/2009 | DiGirolamo | ......... | H04J 11/0093 455/434 |
| 2009/0163223 A1* | 6/2009 | Casey | ................... | H04W 36/22 455/453 |
| 2009/0185543 A1* | 7/2009 | Chen | ..................... | H04W 48/08 370/338 |
| 2010/0099393 A1* | 4/2010 | Brisebois | ............... | H04W 48/16 455/418 |
| 2010/0118830 A1* | 5/2010 | Stephenson | ............. | H04L 63/10 370/331 |
| 2010/0184439 A1* | 7/2010 | Chen | ................. | H04W 36/0061 455/436 |
| 2010/0279648 A1* | 11/2010 | Song | ........................ | H04W 4/22 455/404.1 |
| 2010/0284367 A1* | 11/2010 | Koo | .................. | H04W 36/0055 370/331 |
| 2011/0189997 A1* | 8/2011 | Tiwari | ................... | H04W 36/26 455/443 |
| 2011/0292821 A1 | 12/2011 | Chin et al. | | |
| 2011/0305192 A1* | 12/2011 | Faccin | ................... | H04W 48/18 370/328 |
| 2012/0129517 A1* | 5/2012 | Fox | ..................... | H04L 41/5025 455/425 |
| 2012/0225658 A1* | 9/2012 | Oostveen | .......... | H04W 36/0083 455/437 |
| 2012/0329440 A1* | 12/2012 | Chin | ....................... | H04W 8/24 455/418 |
| 2013/0084864 A1* | 4/2013 | Agrawal | .......... | H04W 36/0083 455/436 |
| 2014/0126544 A1* | 5/2014 | Khay-Ibbat | ........... | H04W 36/30 370/332 |

FOREIGN PATENT DOCUMENTS

| | | |
|---|---|---|
| KR | 10-2010-0061003 A | 6/2010 |
| KR | 10-2010-0070120 A | 6/2010 |
| KR | 10-1037072 B1 | 5/2011 |
| KR | 10-2012-0049555 A | 5/2012 |

* cited by examiner

METHOD OF CONTROLLING HANDOVER

CROSS REFERENCE TO RELATED APPLICATIONS

This application is a National Stage Patent Application of PCT International Patent Application No. PCT/KR2013/006719 (filed on Jul. 26, 2013) under 35 U.S.C. § 371, which claims priority to Korean Patent Application No. 10-2012-0146715 (filed on Dec. 14, 2012), the teachings of which are incorporated herein in their entireties by reference.

TECHNICAL FIELD

The present disclosure relates to a method of controlling handover.

BACKGROUND ART

In order to enhance network efficiency, Long Term Evolution (LTE) may enable constructing a Time Division Duplexing (TDD) network and a Frequency Division Duplexing (FDD) network in a communication network. A terminal capable of supporting a TDD/FDD dual mode may selectively access one of a TDD network and an FDD network in such a coexistence network in which the TDD network and the FDD network coexist.

In this case, the terminal may cause a load of an access network when the terminal executes a service. Therefore, a load distribution method is required to effectively distribute a load in the coexistence network. Furthermore, there is a demand for a method of operating a coexistence network according to a technical characteristic of the TDD network and the FDD network and a network operation policy of a communication provider by selectively controlling a network that the terminal accesses.

The above information disclosed in this Background section is only for enhancement of understanding of the background of the invention and therefore it may contain information that does not form the prior art that is already known in this country to a person of ordinary skill in the art.

DISCLOSURE

Technical Problem

The embodiments of the present disclosure have been made in an effort to provide a method of controlling handover having advantages of controlling a terminal to selectively use a network according to a service by changing a handover condition based on a service used in the terminal.

Technical Solution

An exemplary embodiment of the present disclosure provides a method of controlling handover of a terminal by a first base station, including: setting a handover parameter that is determined based on a handover policy; and transmitting a message including the handover parameter to the terminal, wherein the handover parameter includes a service parameter, and the service parameter is used when determining a handover condition of the terminal in order to induce handover from the first base station to a second base station according to the handover policy.

The handover policy may include a policy that services a first type service through a network of the first base station and that services a second type service through a network of a second base station.

The service parameter may be a parameter that is applied to a handover condition when a service executed in the terminal is the second type service.

The service parameter may include at least one of: a first service parameter that makes a measurement signal of the first base station, which is used when determining a first handover condition, to be smaller than a measurement value; a second service parameter that makes a measurement signal of the first base station, which is used when determining a second handover condition, to be smaller than a measurement value; and a third service parameter that makes a measurement signal of the second base station, which is used when determining a second handover condition, to be larger than a measurement value.

Another embodiment of the present disclosure provides a method of controlling handover of a terminal by a first base station handed over from a second base station to the first base station. The method may include: completing a handover procedure with the terminal in response to a handover request that is received from the second base station; setting a handover parameter that is determined based on a handover policy; and transmitting a message including the handover parameter to the terminal, wherein the handover parameter includes a service parameter, and the service parameter is used when determining a handover condition of the terminal in order to induce use of a service in the first base station according to the handover policy.

The handover policy may include a policy that services a first type service through a network of the first base station and that services a second type service through a network of a second base station.

The service parameter may be a parameter that is applied to a handover condition when a service executed in the terminal is the first type service.

The service parameter may include at least one of: a first service parameter that makes a measurement signal of the first base station, which is used when determining a first handover condition, to be larger than a measurement value; a second service parameter that makes a measurement signal of the first base station, which is used when determining a second handover condition, to be larger than a measurement value, and a third service parameter that makes a measurement signal of the second base station, which is used when determining a second handover condition, to be smaller than a measurement value.

Yet another embodiment of the present disclosure provides a method, by a first base station, of controlling handover of a terminal, including: setting a service parameter that is determined based on a handover policy; receiving a message that requests the service parameter from the terminal; and transmitting a message including the service parameter to the terminal, wherein the service parameter is used when determining a handover condition of the terminal in order to induce handover from the first base station to the second base station according to the handover policy.

The handover policy may include a policy that services a first type service through a network of the first base station and that services a second type service through a network of a second base station.

The receiving of a message may include receiving a message that requests the service parameter from the terminal, having executed the second type service.

Yet another embodiment of the present disclosure provides a method of controlling handover by a terminal. The method may include: storing a service parameter; determining whether to apply the service parameter to a handover condition based on a handover policy; and determining, when applying the service parameter, a handover condition to which the service parameter is applied and reporting to a first base station, wherein the service parameter includes a parameter that is used when determining a handover condition of the terminal in order to induce handover from the first base station to a second base station according to the handover policy.

The handover policy may include a policy that services a first type service through a network of the first base station and that services a second type service through a network of a second base station.

The determining of whether to apply the service parameter may include determining, when a service executed in the terminal is the second type service, to apply the service parameter to a handover condition.

The service parameter may include at least one of: a first service parameter that makes a measurement signal of the first base station, which is used when determining a first handover condition, to be smaller than a measurement value; a second service parameter that makes a measurement signal of the first base station, which is used when determining a second handover condition, to be smaller than a measurement value; and a third service parameter that makes a measurement signal of the second base station, which is used when determining a second handover condition, to be larger than a measurement value.

The storing of a handover parameter may include storing the handover parameter that is received from the first base station.

Advantageous Effects

According to an exemplary embodiment of the present disclosure, a terminal is controlled to select a network according to a service used in the terminal in a coexistence network environment. Therefore, such a network can be economically and efficiently operated. According to an exemplary embodiment of the present disclosure, an appropriate service is induced to be used based on characteristics of each network as well as a load of each network. Therefore, a limited frequency resource can be maximally and efficiently used. Further, according to at least one embodiment of the present disclosure, it may be controlled to selectively use a network according to an associated service by reflecting a policy of a provider.

MODE FOR INVENTION

Figure 1:
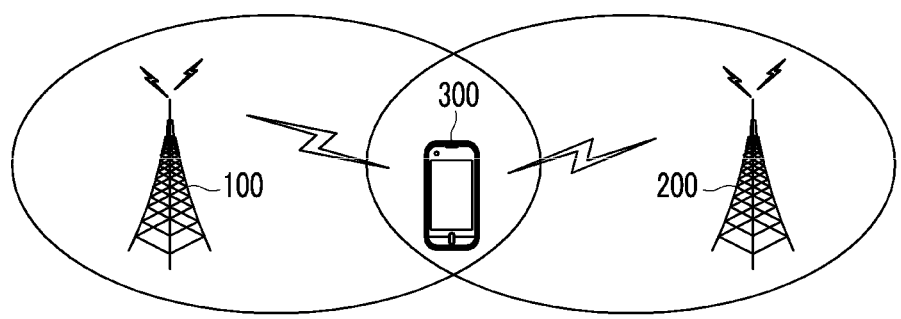
FIG. 1 is a diagram illustrating a coexistence network according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the embodiments of the present disclosure. Accordingly, the drawings and description are to be regarded as illustrative in nature and not restrictive. Like reference numerals designate like elements throughout the specification.

In addition, in an entire specification, unless explicitly described to the contrary, the word "comprise" and variations such as "comprises" or "comprising" will be understood to imply the inclusion of stated elements but not the exclusion of any other elements.

In this specification, a terminal may indicate a Mobile Station (MS), a Mobile Terminal (MT), a Subscriber Station (SS), a Portable Subscriber Station (PSS), User Equipment (UE), and an Access Terminal (AT), and may include an entire function or a partial function of the MS, the MT, the SS, the PSS, the UE, and the AT.

In this specification, a base station (BS) may indicate an Access Point (AP), a Radio Access Station (RAS), a Node B, an evolved NodeB (eNodeB), a Base Transceiver Station (BTS), and a Mobile Multihop Relay (MMR)-BS, and may include an entire function or a partial function of the AP, the RAS, the Node B, the eNodeB, the BTS, and the MMR-BS.

The BS may be separated into an apparatus for processing a radio signal (Remote Radio Head (RRH) or Radio Unit (RU)) and an apparatus for processing a digital signal or a Digital Unit (DU).

Figure 2:
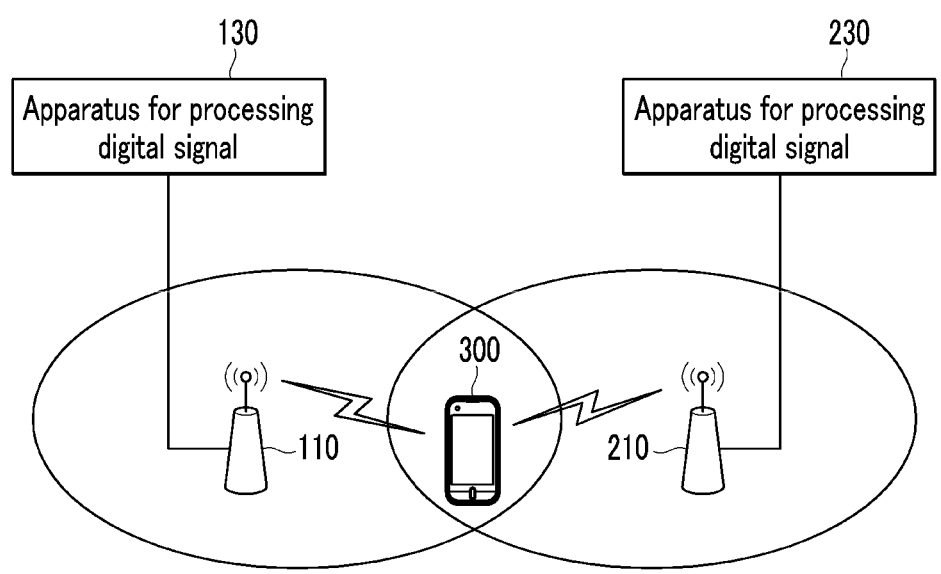
FIG. 2 is a diagram illustrating a communication system according to an exemplary embodiment of the present disclosure.

FIG. 1 is a diagram illustrating a coexistence network according to an exemplary embodiment of the present disclosure, and FIG. 2 is a diagram illustrating a communication system according to an exemplary embodiment of the present disclosure.

Referring to FIG. 1, a coexistence network includes a Time Division Duplexing (TDD) BS 100 and a Frequency Division Duplexing (FDD) BS 200.

A terminal 300 supports a TDD/FDD dual mode. By selectively connecting to one of the TDD BS 100 and the FDD BS 200, the terminal 300 is connected to a core network. The terminal 300 accesses a contents server that is related to a service through the core network. Here, the core network is formed with network entities for packet transmission. For example, the core network may include, for example, a Mobility Management Entity (MME), a Serving Gateway (S-GW), and a Packet Data Network Gateway (PDN-GW).

The TDD BS 100 wirelessly communicates with the terminal 300 based on a TDD method. The TDD BS 100 connects the accessed terminal 300 to the core network. A network that connects the TDD BS 100 and the terminal 300 is referred to as a TDD network.

The FDD BS 200 wirelessly communicates with the terminal 300 based on an FDD method. The FDD BS 200 connects the accessed terminal 300 to the core network. A network that connects the FDD BS 200 and the terminal 300 is referred to as an FDD network.

The TDD BS 100 and the FDD BS 200 share a handover policy and information about a coexistence network. The TDD BS 100 and the FDD BS 200 change a handover condition of the terminal 300 based on a handover policy. That is, by changing a handover condition, the TDD BS 100 and the FDD BS 200 induce handover to another neighboring BS. Various handover policies may exist. Particularly, a handover policy may be set to differently use an access network according to a service type. For example, a handover policy may be set a symmetrical/QoS guarantee service (e.g., Voice over LTE (VoLTE)) to use the FDD network having the same uplink and the downlink in a frequency domain. The handover policy may be set an asymmetrical/broadcasting service to use the TDD network that has a comparatively wider downlink in a frequency domain because asymmetrical/broadcasting service consumes much of a downward resource such as multimedia.

Referring to FIG. 2, the TDD BS 100 and the FDD BS 200 may be separated into an apparatus 110/210 for processing a radio signal (e.g., Remote Radio Head (RRH) or Radio Unit (RU)) and an apparatus 130/230 for processing a digital signal (e.g., a Digital Unit (DU)).

The apparatuses for processing a digital signal 130 and 230 may be integrated into a digital signal processing apparatus.

Hereinafter, a method for inducing handover from a TDD network to a FDD network or inducing handover from a FDD network to a TDD network by changing handover conditions in one of the TDD BS 100 and the FDD BS 200 will be described in detail.

Figure 3:
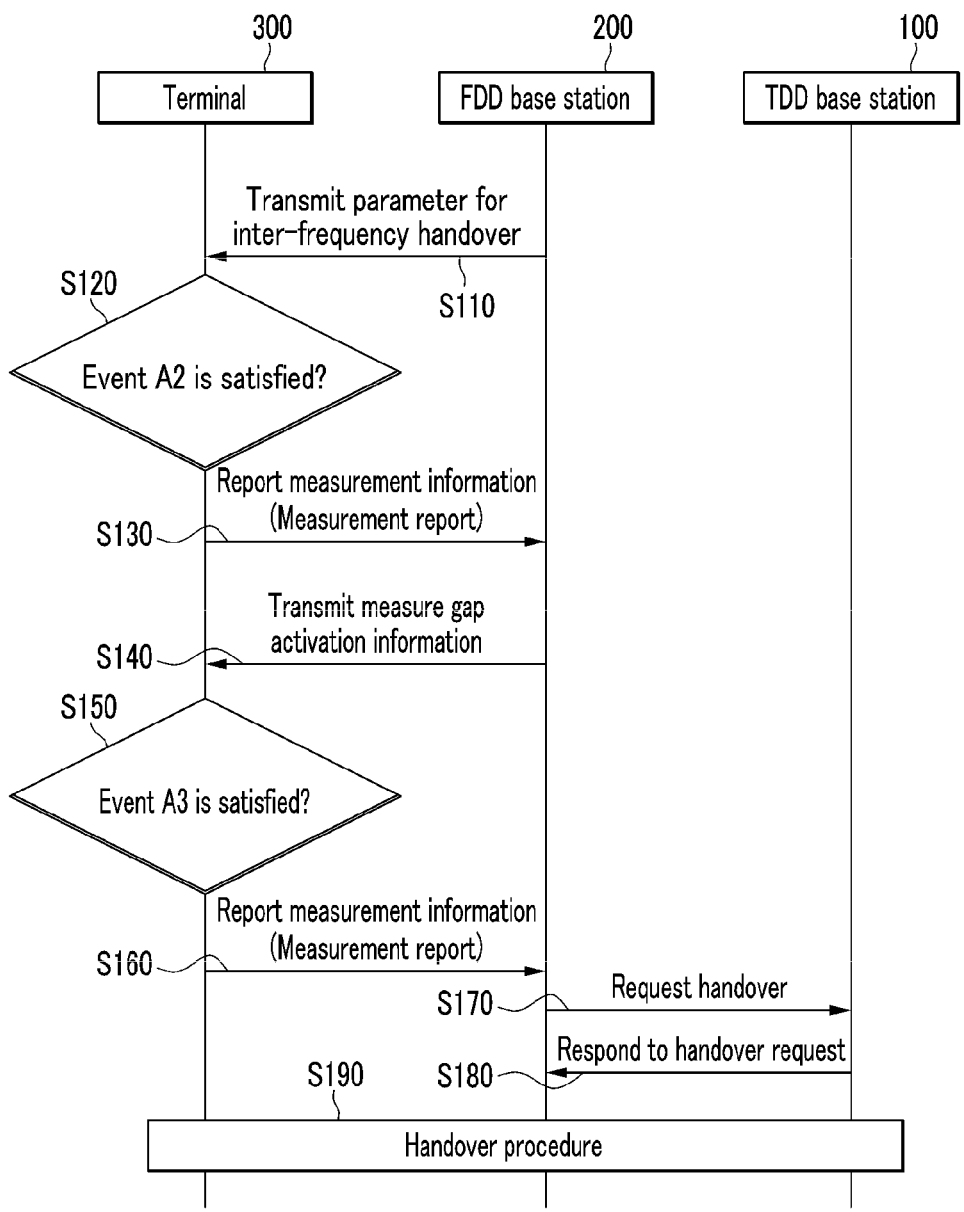
FIG. 3 is a flowchart illustrating a handover procedure according to an exemplary embodiment of the present disclosure.

FIG. 3 is a flowchart illustrating a handover procedure according to an exemplary embodiment of the present disclosure.

Referring to FIG. 3, a handover procedure from a FDD network to a TDD network (e.g., FDD network-TDD network handover) may be performed to follow an inter-frequency handover procedure. A handover condition includes a handover triggering condition (e.g., Event A2) for triggering handover and a handover performing condition (e.g., Event A3) for determining whether to perform handover.

When the terminal 300 is connected to the FDD BS 200, the FDD BS 200 transmits a message (e.g., RRC connection reconfiguration) including a parameter for inter-frequency handover to the terminal 300 (S110).

The terminal 300 determines whether the Event A2 is satisfied (S120).

The terminal 300 reports measurement information that is related to the Event A2 (S130).

The FDD BS 200 transmits an RRC connection reconfiguration including measure gap activation information to the terminal 300 (S140).

The terminal 300 determines whether the Event A3 is satisfied (S150).

The terminal 300 reports measurement information that is related to the Event A3 (S160).

The FDD BS 200 requests handover to the TDD BS 100 (S170).

The TDD BS 100 responds to the handover request to the FDD BS 200 (S180).

Thereafter, the terminal 300 performs handover to the TDD BS 100 (S190).

The Event A2 is a condition that determines whether a measurement signal Ms of the serving cell is worse than a threshold. An entering condition of the Event A2 is the same as Equation 1, and a leaving condition thereof is the same as Equation 2. Here, Hysteresis (Hys) prevents ping-pong phenomenon that alternately satisfies an entering condition of Equation 1 and a leaving condition of Equation 2.

$$Ms+\text{Hys}<\text{Threshold} \qquad \text{[Equation 1]}$$

$$Ms-\text{Hys}>\text{Threshhold} \qquad \text{[Equation 2]}$$

The Event A3 is a condition that determines whether a measurement signal Mn of a neighboring cell is better than a measurement signal Mp of a serving cell/primary cell (PCell) by offset or more. The entering condition of the Event A3 is the same as Equation 3, and the leaving condition thereof is the same as Equation 4.

$$Mn+Ofn+Ocn-\text{Hys}>Mp+Ofp+Ocp+Off \qquad \text{[Equation 3]}$$

$$Mn+Ofn+Ocn+\text{Hys}<Mp+Ofp+Ocp+Off \qquad \text{[Equation 4]}$$

In Equations 3 and 4, Ofn and Ofp are offsets that are related to a frequency of a neighboring cell and a serving cell, respectively, and Ocn and Ocp are offsets that are related to a neighboring cell and a serving cell, respectively.

In this way, the terminal 300 measures a signal of a serving cell and a neighboring cell according to a parameter that is related to the Event A2 and the Event A3.

Figure 4:
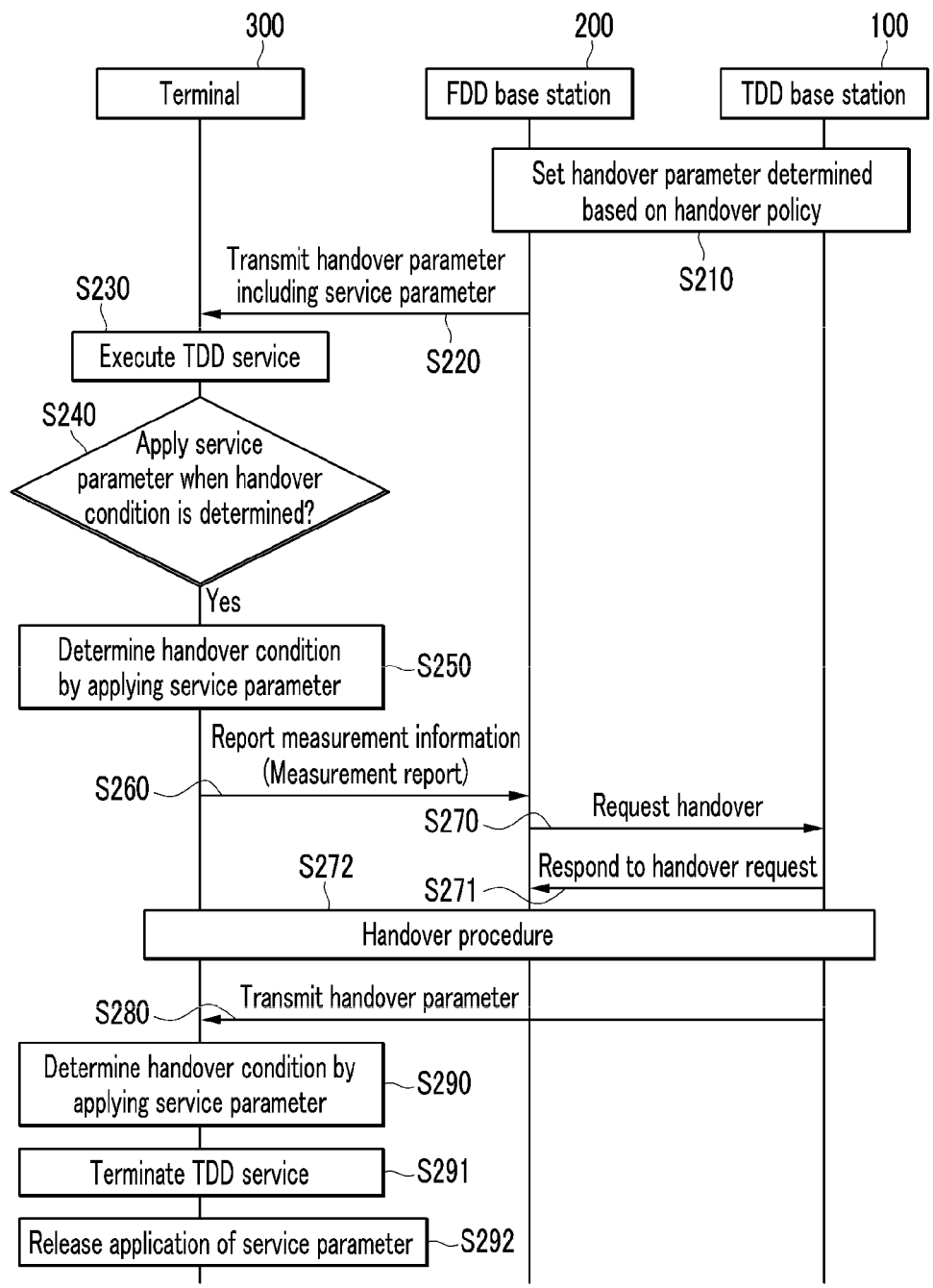
FIG. 4 is a flowchart illustrating a method of controlling handover according to an exemplary embodiment of the present disclosure.

FIG. 4 is a flowchart illustrating a method of controlling handover according to an exemplary embodiment of the present disclosure.

Referring to FIG. 4, the TDD BS 100 and the FDD BS 200 set a handover parameter that is determined based on a handover policy (S210).

The handover policy includes a policy that designates a network to use based on a service type. The handover policy may further include various additional policies such as handover according to a load and handover according to provider necessity. That is, the handover policy may be set to service a first type service through a TDD network and a second type service through an FDD network.

The handover parameter is information that is used for determining a handover condition. The handover parameter includes common handover parameters Ofn, Ofp, Ocn, and Ocp and service specific parameters Osvc, Osp, and Osn that are related to a service. Hereinafter, a parameter that is related to a service is simply referred to as a "service parameter".

The service parameter is a parameter that induces handover to a network designated to an associated service. For example, the service parameter is set to control a terminal to use a network designated to the associated service. Furthermore, the service parameter is a parameter that prevents handover from a designated network of an associated service to another network. That is, the service parameter is set to maintain the designated network of the associated service. The service parameter is applied when determining a handover triggering condition (Event A2) and a handover performing condition (Event A3).

When the terminal 300 is connected to the FDD BS 200, the FDD BS 200 transmits a message (e.g., RRC connection reconfiguration) including a handover parameter (S220). The handover parameter includes a service parameter.

The terminal 300 executes a TDD service (S230). Here, the TDD service is a service that is designated to service in a TDD network according to a handover policy.

When determining a handover condition based on an executed service and a handover policy, the terminal 300 determines whether to apply a service parameter (S240).

When a service that is set to service in the FDD network is executed, the terminal 300 does not apply a service parameter.

Because the executed service is a TDD service, the terminal 300 applies a service parameter when determining a handover condition. (S250).

The terminal 300 changes a measurement signal Ms of a serving cell like Equation 5 using a service parameter Osvc. That is, the service parameter Osvc makes a measurement signal Ms' of the serving cell, which is used when determining a handover condition, to be smaller than an actual value Ms. Therefore, the terminal 300 can easily satisfy a handover triggering condition (Event A2).

$$Ms'=Ms-Osvc \quad \text{[Equation 5]}$$

The terminal 300 changes at least one of a measurement signal Mp of the serving cell/the PCell and a measurement signal Mn of a neighboring cell like Equation 6 using service parameters Osp and Osn. That is, the service parameters Osp and Osn make a measurement signal Ms' of the serving cell/the PCell, which is used when determining a handover condition, to be smaller than an actual value Ms or make a measurement signal Mn' of a neighboring cell to be larger than an actual value Mn. Therefore, the terminal 300 can easily satisfy a handover execution condition (Event A3).

$$Mp'=Mp-Osp$$

$$Mn'=Mn+Osn \quad \text{[Equation 6]}$$

The terminal 300 determines whether a handover condition is satisfied based on a service parameter, and the terminal 300 reports measurement information that is related to the handover condition (S260).

The FDD BS 200 requests handover to the TDD BS 100 (S270).

The TDD BS 100 responds to the handover request to the FDD BS 200 (S271).

Thereafter, the terminal 300 performs handover to the TDD BS 100 (S272).

The TDD BS 100 transmits a message (e.g., RRC connection reconfiguration) including a handover parameter (S280). The handover parameter includes a service parameter. A service parameter sent by the TDD BS 100 is set to a value that makes it difficult for the terminal 300 to perform handover to the FDD BS 200. That is, the TDD BS 100 sets a service parameter to maintain the TDD network to provide a corresponding service. The service parameter may have a sign that is opposite to that of a parameter for inducing handover. Alternatively, in Equations 5 and 6, a service parameter for maintaining a corresponding service with a method of adding a service parameter may be applied.

The terminal 300 determines a handover condition based on a handover parameter including a service parameter (S290).

The terminal 300 terminates a TDD service (S291).

Accordingly, when a handover condition is determined, the terminal 300 releases application of a service parameter (S292). That is, if a TDD service is terminated, the terminal 300 does not apply a service parameter when determining a handover condition.

In this way, the BS provides a service parameter for enabling the terminal to easily move to a network that is designated to an executed service. By applying a service parameter when determining a handover condition, the terminal easily performs handover to a network that is designated to an executed service. Further, the BS provides a service parameter set not to return to a network before handover.

Figure 5:
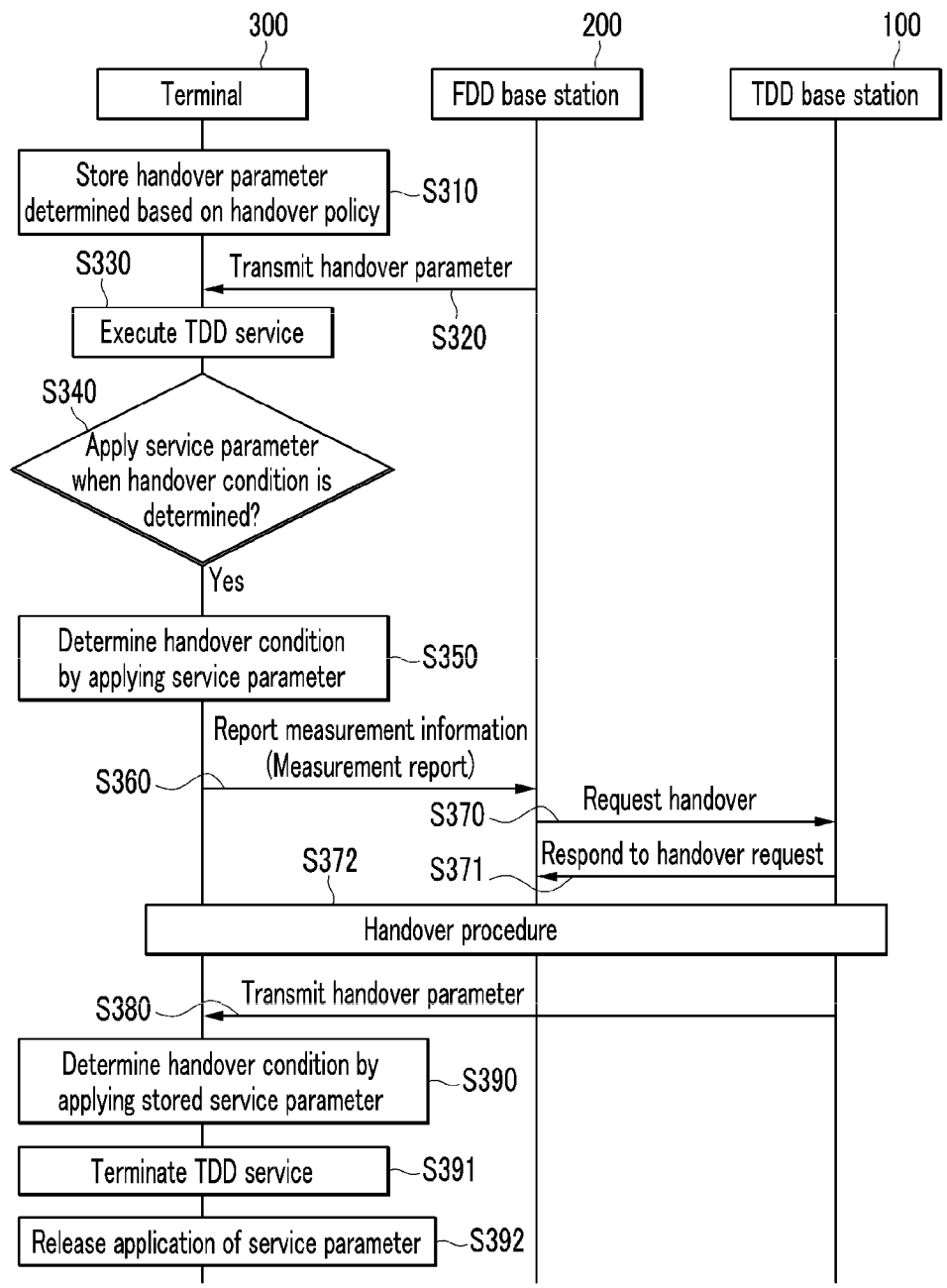
FIG. 5 is a flowchart illustrating a method of controlling handover according to another exemplary embodiment of the present disclosure.

FIG. 5 is a flowchart illustrating a method of controlling handover according to another exemplary embodiment of the present disclosure.

Referring to FIG. 5, the terminal 300 stores a handover parameter that is determined based on a handover policy (S310). The handover policy may be set to service a first type of service in a TDD network and a second type of service in an FDD network. The handover parameter is information that is used for determining a handover condition, and includes service parameters Osvc, Osp, and Osn. The terminal 300 may receive the service parameter from a BS.

When the terminal 300 is connected to the FDD BS 200, the FDD BS 200 transmits a message (RRC connection reconfiguration) including a handover parameter (S320).

The terminal 300 executes a TDD service (S330).

When a handover condition is determined based on an executed service and a handover policy, the terminal 300 determines whether to apply a service parameter (S340).

Because the executed service is a TDD service, the terminal 300 determines a handover condition by applying a service parameter (S350). That is, like Equation 5, the terminal 300 makes a measurement signal Ms' of a serving cell, which is used when determining a handover condition using a service parameter Osvc, to be smaller than an actual value Ms. Like Equations 6 and 7, the terminal 300 makes a measurement signal Ms' of a serving cell/PCell, which is used when determining a handover condition, to be smaller than an actual value Ms or makes a measurement signal Mn' of a neighboring cell to be larger than an actual value Mn, using service parameters Osp and Osn.

The terminal 300 determines whether a handover condition is satisfied based on a service parameter and reports measurement information that is related to the handover condition (S360).

The FDD BS 200 requests handover to the TDD BS 100 (S370).

The TDD BS 100 responds to the handover request to the FDD BS 200 (S371).

Thereafter, the terminal 300 performs handover to the TDD BS 100 (S372).

The TDD BS 100 transmits a message (e.g., RRC connection reconfiguration) including a handover parameter (S380). In this case, the TDD BS 100 transmits only a common handover parameter. Alternatively, the TDD BS 100 may further transmit a service parameter.

The terminal 300 determines whether a handover condition is satisfied based on a stored service parameter (S390). The service parameter is a value that makes it difficult for the terminal 300 to perform handover to the FDD BS 200.

The terminal 300 terminates a TDD service (S391).

Accordingly, when a handover condition is determined, the terminal 300 releases application of a service parameter (S392). That is, if the TDD service is terminated, the terminal 300 does not apply a service parameter when determining a handover condition.

In this way, the terminal stores a parameter that is applied according to a service when determining a handover condition. By applying a service parameter when determining a handover condition, the terminal easily performs handover to a network designated to an executed service. Further, the terminal applies a service parameter until an executed service is terminated so that handover is not performed again to another network even after handover is performed.

Figure 6:
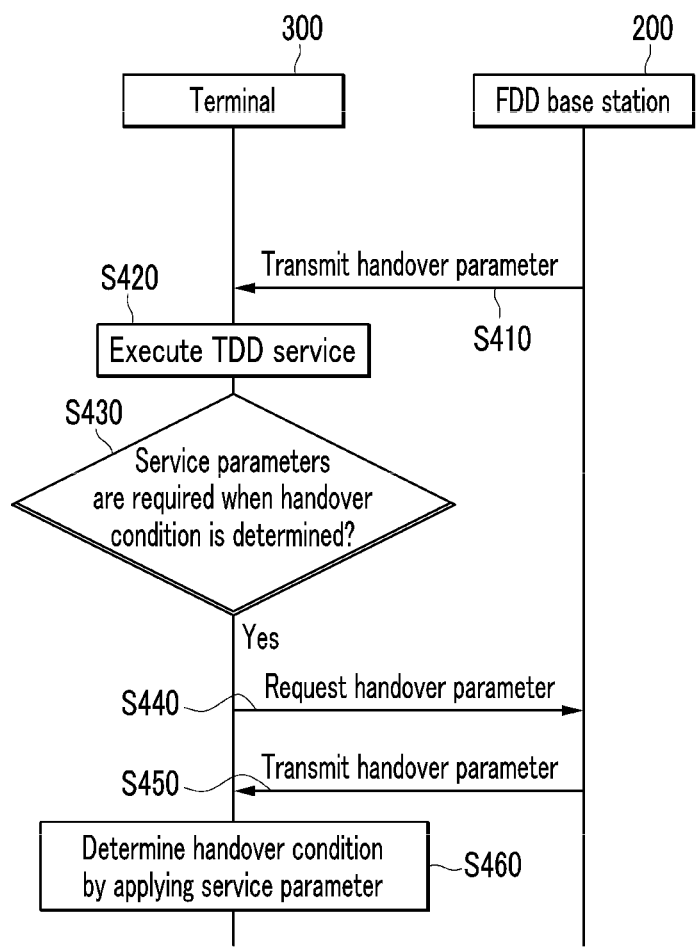
FIG. 6 is a flowchart illustrating a method of controlling handover according to another exemplary embodiment of the present disclosure.

FIG. 6 is a flowchart illustrating a method of controlling handover according to another exemplary embodiment of the present disclosure.

Referring to FIG. 6, a BS may apply a handover policy only to a specific terminal. The handover policy includes a policy that designates a network to be used base on a service type.

When the terminal 300 is connected to the FDD BS 200, the FDD BS 200 transmits a message (e.g., RRC connection reconfiguration) including a handover parameter (S410).

The terminal 300 executes a TDD service (S420).

When a handover condition is determined based on an executed service and a handover policy, the terminal 300 determines whether service parameters Osvc, Osp, and Osn are required (S430).

When a service designated to a TDD network is executed, the terminal 300 requests a handover parameter including a service parameter from the FDD BS 200 (S440).

The FDD BS 200 transmits a handover parameter including a service parameter (S450).

The terminal 300 determines a handover condition by applying the service parameter (S460).

The following handover procedure is similar to that of the foregoing exemplary embodiment.

In this way, the terminal requests a service parameter from the BS based on a service executed by the terminal. Therefore, the BS can apply a handover policy only to a specific terminal. Thereby, by inducing access to a network that is optimized to the service, the BS can provide differentiated quality to the terminal.

Figure 7:
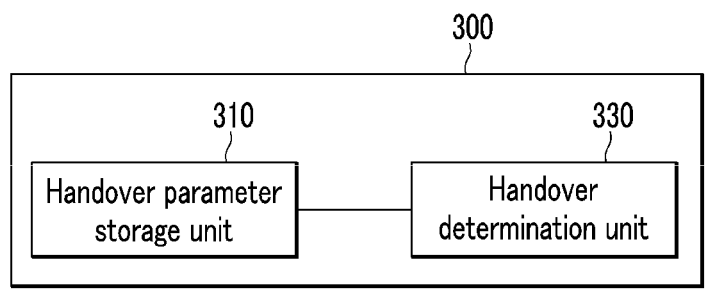
FIG. 7 is a block diagram illustrating a configuration of a terminal according to an exemplary embodiment of the present disclosure.

FIG. 7 is a block diagram illustrating a configuration of a terminal according to an exemplary embodiment of the present disclosure.

Referring to FIG. 7, the terminal 300 includes a handover parameter storage unit 310 and a handover determination unit 330, as elements for handover.

The handover parameter storage unit 310 stores a handover parameter that is determined based on a handover policy. The handover policy may be set to service a first type service through a TDD network and a second type service through an FDD network. The handover parameter is information used for determining a handover condition. For example, the handover parameter includes service parameters Osvc, Osp, and Osn. The handover parameter storage unit 310 may receive a handover parameter from the BS.

The handover determination unit 330 processes a handover according to a handover procedure based on a parameter that is stored at the handover parameter storage unit 310. In this case, when a handover condition is determined based on an executed service and a handover policy, the handover determination unit 330 determines whether to apply a service parameter. When an executed service is not a service that is designated to a present serving cell, the handover determination unit 330 determines a handover condition by applying a service parameter.

The terminal 300 is programmed to implement exemplary embodiments that are suggested in the present disclosure using a processor, a memory, and a transmitting and receiving unit.

Figure 8:
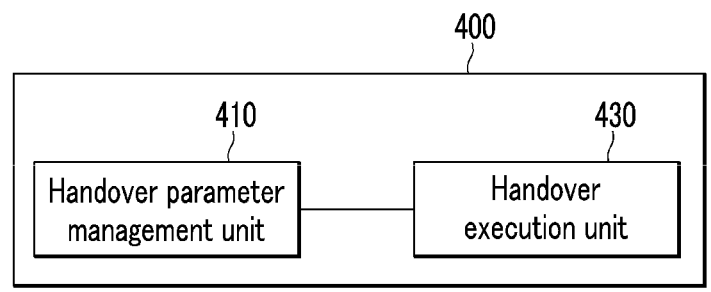
FIG. 8 is a block diagram illustrating a configuration of a handover control apparatus according to an exemplary embodiment of the present disclosure.

FIG. 8 is a block diagram illustrating a configuration of a handover control apparatus according to an exemplary embodiment of the present disclosure.

Referring to FIG. 8, a handover control apparatus 400 includes a handover parameter management unit 410 and a handover execution unit 430. The handover control apparatus 400 is implemented in the TDD BS 100 and the FDD BS 200, and the TDD BS 100 and the FDD BS 200 may control handover. Alternatively, the handover control apparatus 400 may be implemented separately from the TDD BS 100/FDD BS 200.

The handover parameter management unit 410 stores a handover parameter that is determined based on a handover policy. The handover parameter includes various parameters that are related to an inter-frequency handover procedure and a service parameter. When a service is executed in a terminal, the service parameter is a parameter for inducing handover to a network designated to the executed service. The service parameter includes a parameter Osvc that makes a measurement signal Ms' of a serving cell, which is used when determining a handover condition, to be smaller than an actual value Ms. The service parameter also includes parameters Osp and Osn that make a measurement signal Ms' of a serving cell/Pcell, which is used when determining a handover condition, to be smaller than an actual value Ms or that make a measurement signal Mn' of a neighboring cell to be larger than an actual value Mn.

The handover execution unit 430 executes handover according to a handover procedure. In this case, the handover execution unit 430 transmits a parameter that is stored at the handover parameter management unit 410 to a terminal. In this case, the handover execution unit 430 may transmit a service parameter only to a specific terminal.

Here, a policy that designates a network to be used based on a service type is limited, but the BS may change service parameters Osvc, Osp, and Osn according to various handover policies such as a state of a network and provider necessity. Therefore, the BS can easily induce handover only with a service parameter change according to a receiving strategy or a network load in a network on a service basis.

Here, a procedure that performs handover from an FDD BS to a TDD BS is exemplified, but a procedure that performs handover from a TDD BS to an FDD BS is also applied with the same method. Further, the FDD BS and the TDD BS are an example of a network having different frequencies or different communication methods, and embodiments of the present disclosure may be applied to various communication systems that induce handover from a first network to a second network.

As described, a terminal is controlled to select a network according to a service used in the terminal in accordance with at least one embodiment of the present disclosure. Therefore, in a coexistence network environment, the network can be economically and efficiently operated. According to another exemplary embodiment of the present disclosure, an appropriate service may be induced according to characteristics of each network as well as a load of each network. Therefore, a limited frequency resource can be maximally and efficiently used. Furthermore, according to at least one embodiment of the present disclosure, it can be controlled to selectively use a network according to a service by reflecting a policy of a provider.

The foregoing exemplary embodiment of the present disclosure may not only be embodied through an apparatus and a method, but may also be embodied through a program that executes a function corresponding to a configuration of the exemplary embodiment of the present invention or through a recording medium on which the program is recorded.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims.

The invention claimed is:

1. A method of controlling handover of a terminal by a first base station (BS), the method comprising:
   setting a handover parameter that is determined based on a handover policy, wherein the handover policy includes information designating a network type to be used for each service type; and
   transmitting a message comprising the handover parameter to the terminal,
   wherein the handover parameter comprises a service parameter, and the service parameter is used when determining a handover condition of the terminal in order to induce handover from the first BS to a second BS according to the handover policy; and
   wherein the service parameter includes:
      a first service parameter that makes a measurement signal of the first BS, which is used when determining a first handover condition, to be smaller than a measurement value;
      a second service parameter that makes a measurement signal of the first BS, which is used when determining a second handover condition, to be smaller than a measurement value; and
      a third service parameter that makes a measurement signal of the second BS, which is used when determining a second handover condition, to be larger than a measurement value.

2. The method of claim 1, wherein the handover policy comprises a policy that services a first type service through a first network of the first BS and that services a second type service through a second network of the second BS.

3. The method of claim 2, wherein the service parameter is applied to a handover condition when a service executed in the terminal is the second type service.

4. A method of, by a first base station (BS), controlling handover of a terminal handed over from a second BS to the first BS, the method comprising:
   completing a handover procedure with the terminal in response to a handover request that is received from the second BS;
   setting a handover parameter that is determined based on a handover policy, wherein the handover policy includes information designating a network type to be used for each service type; and
   transmitting a message comprising the handover parameter to the terminal,
   wherein the handover parameter comprises a service parameter, and the service parameter is used when determining a handover condition of the terminal in order to induce use of a service in the first BS according to the handover policy; and
   wherein the service parameter includes:
   a first service parameter that makes a measurement signal of the first BS, which is used when determining a first handover condition, to be larger than a measurement value;
   a second service parameter that makes a measurement signal of the first BS, which is used when determining a second handover condition, to be larger than a measurement value; and
   a third service parameter that makes a measurement signal of the second BS, which is used when determining a second handover condition, to be smaller than a measurement value.

5. The method of claim 4, wherein the handover policy comprises a policy that services a first type service through a network of the first BS and that services a second type service through a network of the second BS.

6. The method of claim 5, wherein the service parameter is applied to a handover condition when a service executed in the terminal is the first type service.

7. A method of, by a first base station (BS), controlling handover of a terminal, the method comprising:
   setting a service parameter that is determined based on a handover policy, wherein the handover policy includes information designating a network type to be used for each service type;
   receiving a message that requests the service parameter from the terminal; and
   transmitting a message comprising the service parameter to the terminal,
   wherein the service parameter is used when determining a handover condition of the terminal in order to induce handover from the first BS to a second BS according to the handover policy; and
   wherein the service parameter includes:
      a first service parameter that makes a measurement signal of the first BS, which is used when determining a first handover condition, to be smaller than a measurement value;
      a second service parameter that makes a measurement signal of the first BS, which is used when determining a second handover condition, to be smaller than a measurement value; and
      a third service parameter that makes a measurement signal of the second BS, which is used when determining a second handover condition, to be larger than a measurement value.

8. The method of claim 7, wherein the handover policy comprises a policy that services a first type service through a network of the first BS and that services a second type service through a network of the second BS.

9. The method of claim 8, wherein the receiving of a message comprises receiving a message that requests the service parameter from the terminal, having executed the second type service.

10. A method of controlling handover by a terminal, the method comprising:
    storing a service parameter;
    determining whether to apply the stored service parameter to a handover condition based on a handover policy, wherein the handover policy includes information designating a network type to be used for each service type; and
    determining, when applying the service parameter, a handover condition to which the service parameter is applied and reporting to a first base station (BS),
    wherein the service parameter comprises a parameter that is used when determining a handover condition of the terminal in order to induce handover from the first BS to a second BS according to the handover policy; and
    wherein the service parameter includes:
    a first service parameter that makes a measurement signal of the first BS, which is used when determining a first handover condition, to be smaller than a measurement value;
    a second service parameter that makes a measurement signal of the first BS, which is used when determining a second handover condition to be smaller than a measurement value; and a third service parameter that makes a measurement signal of the second BS, which is used when determining a second handover condition, to be larger than a measurement value.

11. The method of claim 10, wherein the handover policy comprises a policy that services a first type service through a network of the first BS and that services a second type service through a network of the second BS.

12. The method of claim 11, wherein the determining of whether to apply the service parameter comprises:
determining, when a service executed in the terminal is the second type service, to apply the service parameter to a handover condition.

13. The method of claim 10, wherein the storing of a handover parameter comprises storing the handover parameter that is received from the first BS.

* * * * *